United States Patent [19]
Cardis et al.

[11] Patent Number: 4,535,996
[45] Date of Patent: Aug. 20, 1985

[54] GASKET ASSEMBLY FOR OIL PANS AND THE LIKE AND METHOD OF MAKING SAME

[75] Inventors: James C. Cardis, Chicago; Josefino T. Inciong, Des Plaines, both of Ill.

[73] Assignee: Felt Products Mfg. Co., Skokie, Ill.

[21] Appl. No.: 692,507

[22] Filed: Jan. 18, 1985

[51] Int. Cl.³ ............................................... F16J 15/12
[52] U.S. Cl. ....................................... 277/1; 277/166; 277/180; 277/211; 277/235 B
[58] Field of Search .................... 277/1, 166, 216, 180, 277/235 R, 207 R, 235 A, 235 B

[56] References Cited

U.S. PATENT DOCUMENTS

| | | | |
|---|---|---|---|
| 1,985,473 | 12/1934 | Victor | 277/235 B |
| 2,167,643 | 8/1939 | Dickson | 277/235 B |
| 2,681,241 | 6/1954 | Aukers | 277/235 B X |
| 2,722,043 | 11/1955 | Nenzell | 277/180 X |
| 4,204,691 | 5/1980 | Takase et al. | 277/166 X |

FOREIGN PATENT DOCUMENTS

| | | | |
|---|---|---|---|
| 1371754 | 10/1974 | United Kingdom | 277/235 B |
| 2097070 | 10/1982 | United Kingdom | 277/235 B |

*Primary Examiner*—Robert S. Ward
*Attorney, Agent, or Firm*—Dressler, Goldsmith, Shore, Sutker & Milnamow, Ltd.

[57] ABSTRACT

A unitary, molded gasket assembly having a pair of side sections, each having a rigid assembly comprising a rigid core member and stop members. The stop members each define a fastener aperture through which a fastener is adapted to pass. The rigid core members extend along side portions of the gasket assembly. Elastomeric envelopes envelop each of the core members and provide side sections of a first thickness. Elastomeric end portions join the envelope. The stop members are hard, rigid, and high-temperature resistant, and are of a second thickness less than the first thickness. When the gasket assembly is compressed between elements to be sealed, the stop members limit compression of the gasket and limit displacement of the elastomeric envelopes. Each side section envelope is preferably provided with undercuts at its edges, the undercuts extending inwardly from the edges to over the core to limit displacement of the elastomer at the core edges. The cores and stops are preferably separate, the cores being of metal and the stops being of sintered metal. A method of making such a gasket is disclosed.

21 Claims, 13 Drawing Figures

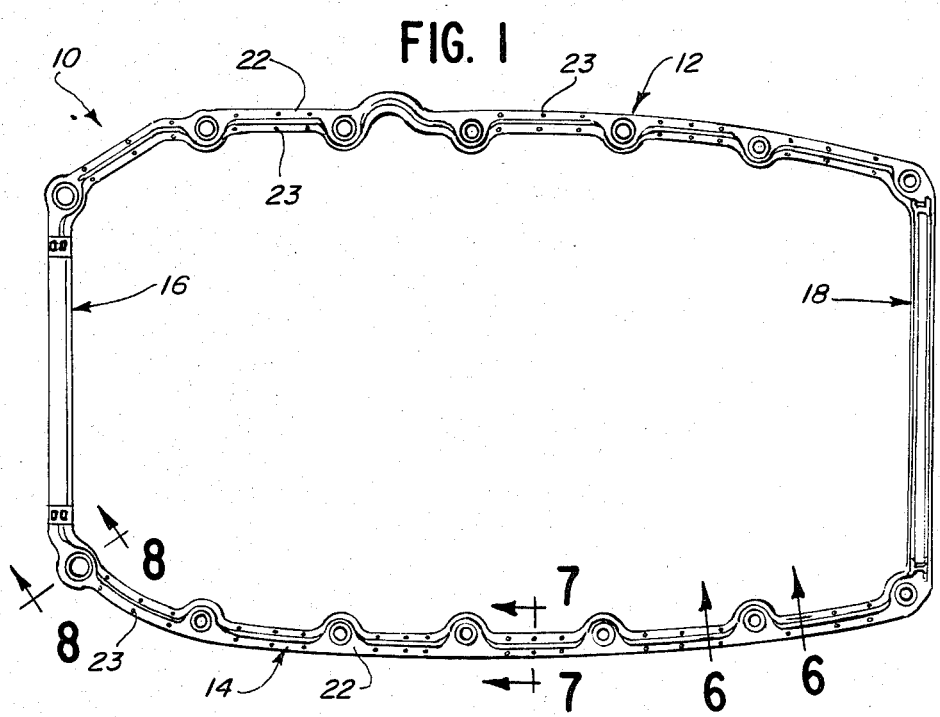

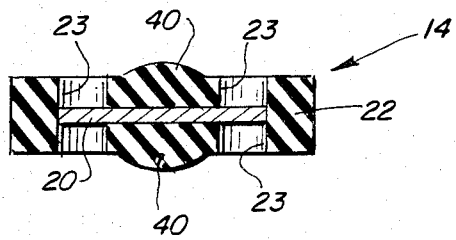
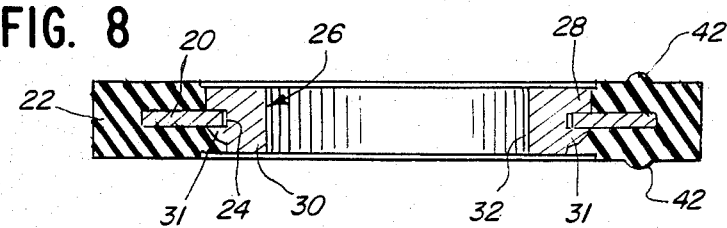
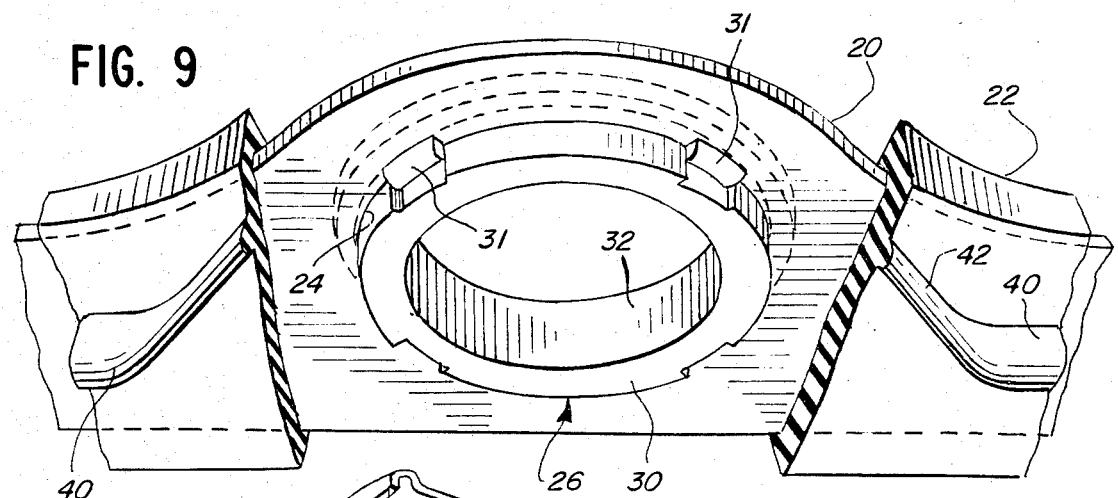
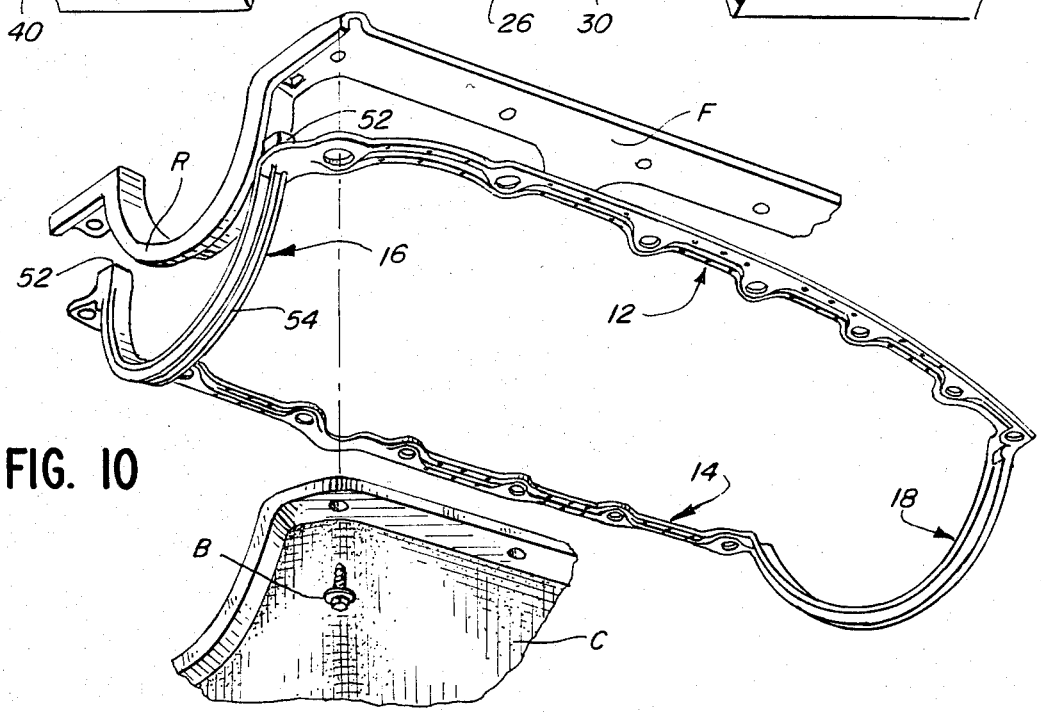

GASKET ASSEMBLY FOR OIL PANS AND THE LIKE AND METHOD OF MAKING SAME

BACKGROUND OF THE INVENTION

This invention relates to improved gaskets, and particularly to improved oil pan gaskets for automotive use.

In a typical environment in which an oil pan gasket of the present invention is adapted to be used, a suitable engine flange at the base of the engine is present. The flange may terminate rearwardly at a retainer, such as a centrally located rear main bearing cap which holds the bearing for the drive shaft. The flange may terminate at the front in a retainer, such as in a timing chamber cover, or at part of the oil pump structure or the like. Most frequently the mating oil pan cover has two generally flat side main flange surfaces which confront the engine flanges and two generally semi-circular recesses at the ends of the cover which receive the bearing cap and other engine component at the front. Thus, to seal in such an environment, the gasket must be generally flat along its side portions and must have end portions which are generally concave to match the generally semi-cylindrical openings in the oil pan.

In the past, frequently four pieces, two generally flat pieces and two generally concave pieces, have been used to seal in this environment, both in original manufacture and in the after-market. When it is appreciated that the gasket must be secured upside-down to the engine (especially during repair), it will be appreciated that such installation is extremely tedious and difficult, and frequently requires additional tube-dispensed sealants to be used as well.

Unitary prior art molded rubber gaskets also exist. Generally they comprise a main body defining bolt or fastener holes and concave ends. These are difficult to install because they are limp. They also suffer from splitting problems at the fastener holes.

Some of the prior art gaskets utilize narrow beads along their lengths around the fastener holes to assist in sealing. Some such gaskets also define additional openings adjacent the fastener holes which receive stops formed with the engine or oil pan to control compression. Other such gaskets simply utilize flat rubber main bodies.

Other prior art molded gaskets for oil pans are generally bead-like in nature. Such gaskets are sometimes used in constructions in which the engine or oil pan defines a recess to receive a bead, like an O-ring or a ring having a cross-section with multiple bead like projections, for sealing in the recess and against the confronting flange. Seals such as this simply cannot realistically be used with flat sealing surfaces, because installation in original manufacture and especially during in-place repair would be virtually impossible.

Because of their difficulties of installation, and because of inherent defects in their sealing characteristics and ability to withstand usual torquing loads, because of variations in engine blocks and fastener holes therein, and for other reasons, oil pan gaskets frequently fail to seal fully and properly. Occasionally this results in higher oil consumption in addition to the failure of an engine. More frequently this results in the familiar oil spots on garage floors and elsewhere. Further, the use of typical oil pan gaskets as described above, such as limp or multi-piece gaskets, makes it virtually impossible for robot installation of the gasket in original manufacture.

Thus, for those and other reasons, an improved oil pan gasket is highly to be desired.

One possible solution to some of the problems would be to provide a molded rubber gasket with a rigid core, such as a metallic core. This would provide sufficient rigidity for a robot to handle and place the gasket appropriately. However in such gaskets, holes are formed therein to accommodate fasteners such as bolts for securing the gasket appropriately relative to the engine and oil pan cover (the zone to be sealed by the gasket). When the fasteners are positioned and tightened, any excess of torquing load tends to split the rubber adjacent to the edge of the core, the gasket then loses its integrity, and the gasket will then tend to fail as an adequate seal. Because the sheet metal sealing flange of the oil pan cover is relatively flexible, the fasteners must be pulled down tightly to maintain the seal therebetween. Thus, even if the torque applied to the fasteners is controlled it is not realistically possible to prevent rubber splitting. Hence the typical molded rubber gasket with a rigid core, such as a metallic core, is not fully suitable as an effective oil pan cover gasket, and the careful control of torquing loads is not a fully effective solution.

It has been determined that the splitting of the rubber is generally in line with the edge of the metal cores commonly used in oil pan gasket environments. It appears that when the gasket is compressed between a pair of flanges to be sealed, the rubber is excessively stressed in multiple directions. Because the rubber does not compress in the sense of being reduced in volume, it becomes displaced. When it is displaced along or towards the edge of a metal core, the core edge may be viewed as acting as a knife edge, tending to cut the rubber which moves relative to it. This weakens the gasket, and produces a weakness in the rubber along the core edge, resulting in the subsequent splitting of the gasket, and its failure.

SUMMARY OF THE INVENTION

Having ascertained a possible significant major reason for the failure of gaskets, such as oil pan gaskets provided with a rigid core, such as a metal core, it was discovered that the elimination of stress and the tendency to displacement of the rubber in the zone of the edge of the core tended to eliminate the splitting problem. Thus, in one aspect of the present invention, it was determined that splitting was substantially eliminated by producing undercuts in the rubber in the zones at which displacement would otherwise occur, or by eliminating such zones altogether by bringing the core substantially to the edge of the rubber so that there was no significant zone in which displacement of the rubber relative to the core edge could take place.

However, to provide rubber undercuts in the rubber adjacent the fastener holes or to bring the core to the edge of the rubber adjacent the fastener holes presents certain molding difficulties as well as certain difficulties in providing effective seals in a convenient manner.

Therefore, in accordance with one preferred form of the present invention, an improved solution to eliminating rubber splitting is provided. In this form a stop means is provided at each of the fastener holes to limit compression of the gasket assembly, hence to limit and restrict the deformation and displacement of the rubber thereat. As such, the rubber is prevented from moving sufficiently to be "cut" or worked by any edge of the metal core. By providing a rigid stop in the zone of a fastener hole, when the associated fastener is torqued, the stop engages the surfaces to be sealed, limiting further closure of the surfaces, hence positively limiting the displacement of the rubber. Especially where the rigid stop is metallic, the metal-to-metal contact advantageously also produces specific, controlled torque retention. Such torque retention is not dependant upon stress relaxation of the rubber sealing material. Further, to the extent that metal-to-metal contact is not produced during the original clamp-up, upon relatively minor stress relaxation of the associated rubber, complete closure of the surfaces to the stop will produce a fully controlled seal.

Because gasket assemblies of this invention may be compressed only a limited amount, say several thousandths of an inch, and because the oil pan flange bows between the fastener holes, auxiliary sealing means may be provided between the fastener holes to assure effective sealing. To that end, rather than using a flat main gasket body between the fastener holes, one or both of the main gasket surfaces may be provided with an auxiliary sealing mechanism, such as a bead of a V-shape or domed type. This bead preferably extends above the main surface of the gasket and concentrates the available load in a relatively narrow zone, thereby to achieve the maximum sealing effect from the relatively small loads available. Generally the bead tapers nearby and towards the fastener hole, preferably at least in the horizontal plane. Thus the width of the bead reduces nearby the fastener hole. The bead may also taper in height, and continuously in vertical height from fastener hole to fastener hole, as along the arc of a large circle.

Also, to provide a bead, hence a seal, which is continuous, a narrow bead, which in some circumstances may be of lesser aggregate height than the main bead, may be provided around the fastener hole. Such a bead may intersect and merge with the main beads which terminate adjacent each side of a fastener hole. The beads therefore provide a continuous high unit loading back-up seal along the length of the sides of the gasket.

Thus, in accordance with the present invention and with the presently preferred embodiment thereof, there is provided a unitary molded gasket assembly comprising a pair of side sections, each having a rigid core member, as of metal, defining a plurality of core holes, the metal core members extending along side portions of the gasket assembly. Elastomeric envelopes substantially surround each of the core members and have side sections of a first thickness. Integral elastomeric end portions join the envelopes. Each of the envelopes defines openings therethrough in line, respectively, with the core holes. Hard, rigid, temperature-resistant stop members are provided at each core hole and are secured in the gasket assembly. Each stop member defines an aperture through which a fastener such as a bolt is adapted to pass. The stop members are of a second thickness less than the first thickness. As such, when the gasket assembly is compressed between elements to be sealed, the stop members limit compression and limit displacement of the elastomeric envelopes to prevent splitting of them.

Although the presently preferred embodiment contemplates separate core members and stops of different materials to be assembled to each other, it is contemplated that suitable plastic or other materials may be used to integrally form a composite core-stop assembly.

Desirably each envelope is provided with elastomeric beads projecting outwardly from the envelope between the fastener holes to concentrate sealing forces thereat when the gasket assembly is compressed. In a preferred form each envelope is provided with transitional beads bridging the elastomeric beads, the elastomeric beads and the transitional beads thereby providing a continuous sealing bead along each side section. The continuous sealing beads may merge with the end sections.

In a preferred embodiment the gasket is an oil pan gasket, the end portions are arched, and the arched end portions define beaded surfaces to concentrate sealing forces applied thereto. The stop members may comprise an enlarged head and a smaller shank disposed in the hole, with the shank being staked to the core in the core holes. The second thickness is preferably at least seventy five percent of the first thickness.

Further objects, features and advantages of the present invention will become apparent from the following description and drawings.

DESCRIPTION OF THE DRAWINGS

FIG. 1 is a bottom plan view of an oil pan gasket assembly in accordance with the present invention;

FIG. 2 is an end elevation of FIG. 1 viewed from the left;

FIG. 3 is an end elevation of FIG. 1 viewed from the right;

FIG. 4 is a cross-sectional view taken along line 4—4 of FIG. 2;

FIG. 5 is a cross-sectional view taken along line 5—5 of FIG. 3;

FIG. 6 is a cross-sectional view taken along line 6—6 of FIG. 1;

FIG. 7 is a cross-sectional view taken along line 7—7 of FIG. 1;

FIG. 8 is a cross-sectional view taken along line 8—8 of FIG. 1;

FIG. 9 is an enlarged, fragmentary perspective view, partially broken away, of the gasket assembly of FIG. 1;

FIG. 10 is a fragmentary, exploded perspective view of the gasket assembly of FIG. 1 juxtaposed with engine parts;

DETAILED DESCRIPTION OF A PRESENTLY PREFERRED EMBODIMENT

Figure 11:
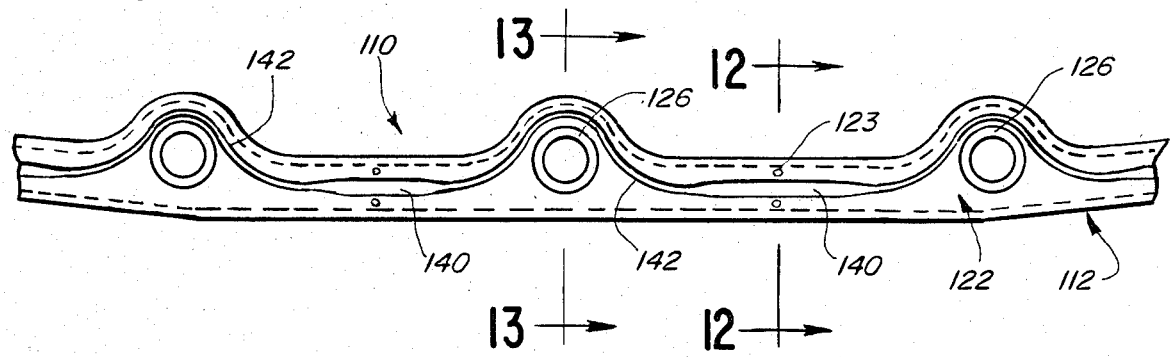
FIG. 11 is a plan view of a segment of a gasket assembly like that of FIG. 1, but of a further embodiment.

Referring now to the drawings which illustrate a presently preferred embodiment of the present invention, FIG. 1 shows a gasket assembly 10 formed for use as an oil pan gasket. Gasket assembly 10 comprises a pair of generally elongate, relatively rigid side portions or sections 12, 14, and a pair of concave or arched end sections 16, 18.

Each of the side sections 12, 14 defines a plurality of fastener holes and comprises a rigid core, such as a metal core 20, embedded within a molded elastomeric or rubber envelope 22. Cores 20 may be stamped, punched or otherwise formed from cold rolled steel. The elastomer may vary and may desirably be nitrile, polyacrylic or silicone rubber. The end sections 16, 18 are of molded rubber. The envelopes 22 and end sections are integrally molded and join each other at the ends of the side sections.

As best seen in FIGS. 8 and 9, the envelopes define bolt hole openings and the cores 20 define a plurality of core holes 24. Each core hole 24 is provided with a separate, annular, torque limiting rigid stop member or stop 26. Stop 26 comprises an enlarged head 28 of a first outer diameter and a smaller shank 30 of a lesser diameter. The diameter of head 28 is greater than that of core hole 24 and the diameter of the shank 30 is just slightly less than that of the core hole 24. The shank 30 is staked, i.e., worked to develop projections 31 from the shanks, thereby to secure the stop 26 to the core 20, hence to the gasket assembly, in the core hole 24. Preferably, the shank is staked in four equidistantly spaced locations so that it will be stably held in position. The aperture or opening 32 in each stop actually serves as the passage in the gasket assembly through which a fastener, such as a bolt passes to secure the gasket assembly 10 in place in an engine.

In a preferred form, the stops are compression formed from sintered metal such as of powdered iron. However, they may be formed of machined metal or even of hard plastic which is suitably temperature-resistant and torque resistant. Under some circumstances, it may be possible to form integral core-stop subassemblies of a suitable hard plastic.

In the fabrication of a gasket assembly, cores 20 are suitably provided with rigid stops 26. These subassemblies are then positioned in a suitably configured mold, and they are then integrated with the selected elastomer to provide the properly configured rubber envelopes 22 and arched end sections 16, 18. In the molding process, locating pins are used to center the cores, leaving openings 23 in the surfaces of the envelopes when the gasket assemblies are completed.

As seen in FIGS. 6 and 8, the stops 26 are recessed only slightly from the surface of the envelopes 22 adjacent the fastener holes. For example, the stops may be 0.090 inch high, defining openings 32 of say 0.28 inch in diameter. The envelope thickness at the edge of the stops 26 may be about 0.10 inch. The envelope is of a first thickness and the stop is of a second lesser thickness. Thus, it is seen that compression of the rubber adjacent the fastener holes 24 will be limited to only about 0.01 inch, i.e., about 12.5%. This limitation of the compression will serve to so restrict deformation and displacement of the rubber, that splitting of the rubber adjacent the fastener holes will be prevented. Desirably the second (stop) thickness is no less than about 75% of the thickness of the envelope.

It will be apparent that the stops limit compression of the rubber and of the gasket in the zones of the fastener holes. Although an effective seal can be provided at the fastener holes where the torquing loads are adequate, because the oil pan flange frequently bows between fastener holes, sealing therebetween must be provided therebetween as well. To that end, the side sections 12, 14 are provided with sealing beads which serve to concentrate the available sealing loads therealong.

In one form, as seen in FIG. 9, generally centrally located elongate beads 40 extending between each pair of fastener holes and along each major surface of the side sections are provided. Beads 40 terminate adjacent the fastener holes and are domed or generally V-shaped in cross-section. In the zones of the core holes 24, the beads 40 taper both in height and width (see FIG. 9), i.e., both in the vertical and horizontal planes. The beads 40 may also taper continuously in vertical height between pairs of fastener holes, as along the arc of a great circle. Specific configurations of the beads to be used will depend in part upon the overall gasket assembly and the oil pan cover to be used. The more the cover tends to bow, the more consideration will be needed regarding the dimensioning and shape of the beads 40.

Auxiliary or transitional beads 42 are also provided to isolate the bolt hole from the interior of the gasket. Beads 42 bridge adjacent elastomeric beads 40 and are of a lesser overall height and of a lesser width than are beads 40 and are intended to provide a seal secondary to the surface of the envelope 22 itself. Beads 42 should not take up very much of the available load and should not interfere with the concentrating of the sealing load between the fastener holes as taken up by the beads 40. Thus, beads 40, 42 provide a continuous bead along each side section, and which bead merges into the end sections.

In a typical oil pan gasket assembly, the side sections are 0.1 inch thick. The beads 42 are semi-circular with a height on each side of about 0.015 inch. The beads 40 on each side may have a height of about 0.015 inch at the centers, and taper at their ends.

Referring now to FIGS. 2–5 and 10, end sections 16, 18 are configured to accommodate to the particular engine structure with which gasket assembly 10 is to be used. Generally the front end mounts a retainer against which a seal continuous with the block flanges F must be provided at the front of the engine. At the rear of the engine another element, such as a retainer R must be sealed continuous with the block flanges. As such, arched end sections 16, 18 are configured on one side to seal against the retainer, and on the other side to seal against the oil pan cover C.

To that end, arched end section 16, which in this embodiment seals against a rear retainer R comprises a generally flat surface 50, extensions or feet 52 which fit into notched zones in the engine assembly at which the transition between the block and oil pump sleeve occurs, and a tapered double beaded surface 54 which sealingly engages against the oil pan cover C. The double bead provides for high unit contact, hence more effective sealing. The ends of the metal cores 20 terminate above the extensions 52 and are thus embedded in the column of rubber comprising the extensions 52 and the main body of the arched end section 16. This minimizes the tendency of the rubber to split.

End section 18 defines a double beaded interior surface 60 which is configured to seal against the front retainer. The outer surface 62 is double beaded and proportioned to seal against the associated oil pan cover C surface. The double beading provides high unit contact.

The oil pan cover gasket assembly 10 of the present invention is adapted to be installed in a known manner. On a new engine, it is simply put in place, even by robot installation, with the oil pan cover C applied, and with fasteners B then threaded into position and torqued. The torquing is limited by stops 26, thereby eliminating splitting of the gasket assembly and avoiding leaking of oil and occasional engine failure. The stops also provide a controlled level of torque retention. The gasket effectively seals via the gasket body and associated beads.

During service and repair, where replacement is usually from below the car (as illustrated by FIG. 10), the oil pan cover is cleaned, the engine body flanges and associated retainer portions are cleaned, the cover flanges are straightened, and the gasket assembly 10 is then rested on the cover, the cover is elevated into position, and the fasteners are secured. This is much simpler, cleaner and more expedient than with the typical prior art oil pan gasket assemblages. Not only that, the gasket assembly provides a more effective seal, and one which is not subject to leakage due to gasket splitting. Further, with metal cores or other rigid assemblies, accurate fastener placement is provided for, thereby to positively and accurately index the gasket assembly relative to the engine block and oil pan cover.

Figure 13:
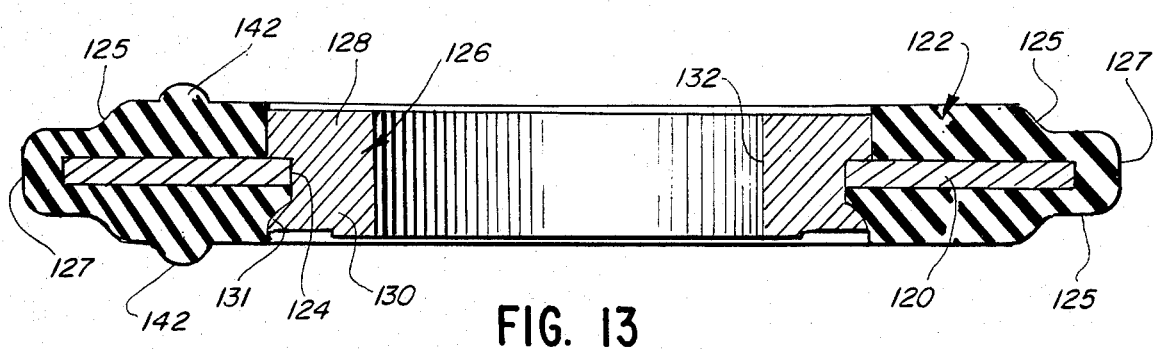
FIG. 13 is an enlarged cross-sectional view taken substantially along line 13—13 of FIG. 11.
Figure 12:
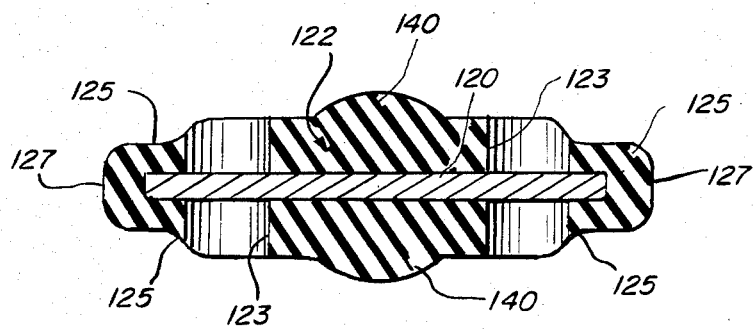
FIG. 12 is an enlarged cross-sectional view taken substantially along line 12—12 of FIG. 11, and in a location like FIG. 7.

Referring now to FIGS. 11-13 which illustrate a further embodiment of the present invention, FIG. 11 shows a portion of a gaskset assembly 110 formed for use as an oil pan gasket. Gasket assembly 110, except as otherwise described is like gasket 10 of FIG. 1, and comprises a pair of generally elongate, relatively rigid side portions or sections and a pair of concave or arched end sections.

Each of the side sections, such as side section 112, defines a plurality of fastener holes and comprises a rigid core, such as a metal core 120, embedded within a molded elastomeric or rubber envelope 122. Cores 120 may be stamped, punched or otherwise formed from cold rolled steel. The elastomer used may be nitrile, polyacrylic, silicone or other elastomeric materials.

The envelopes 122 define fastener hole openings and the cores 120 define a plurality of core holes 124. Each core hole 124 is provided with a separate, annular, torque limiting rigid stop member or stop 126. Stop 126 comprises an enlarged head 128 of a first outer diameter and a smaller shank 130 of a lesser diameter. The diameter of head 128 is greater than that of core hole 124 and the diameter of the shank 130 is just slightly less than that of the core hole 124. The shank 130 is staked, i.e., worked to develop projections 131 from the shanks, to secure the stop 126 to the core 120, hence to the gasket assembly, in the core hole 124. Preferably, the shank is staked in four equidistantly spaced locations so that it will be stably held in position. The aperture or opening 132 in each stop actually serves as the passage in the gasket assembly through which a fastener passes to secure the gasket assembly 110 in place in an engine.

The stops 126 may be compression formed like stops 26 and the gasket assembly 110 may be formed like gasket assembly 10, leaving openings 123 like openings 23 in certain locations as a result of the fabricating process.

As seen in FIG. 13, the stops 126 are recessed only slightly from the surface of the envelopes 122 adjacent the fastener holes. For example, the stops may be 0.090 inch high, defining openings 132 of say 0.28 inch in diameter. The envelope thickness at the edge of the stops 126 may be about 0.10 inch. The envelope is of a first thickness and the stop is of a second lesser thickness. Thus, it is seen that compression of the rubber adjacent the fastener holes 124 will be limited. Compression will serve to so restrict deformation and displacement of the rubber, that splitting of the rubber adjacent the fastener holes will be prevented. Like the side sections 12, 14, side sections 112 are provided with sealing beads which serve to concentrate the available sealing loads therealong. Thus, generally centrally located elongate beads 140 extending between each pair of fastener holes and along each major surface of the side sections are provided. Beads 140 are domed or generally V-shaped in cross-section. In the zones of the core holes 124, the beads 140 taper in width and merge with auxiliary or transitional beads 142 which isolate the fastener hole from the interior of the gasket. Beads 142 bridge adjacent elastomeric beads 140 and are of a lesser width than are beads 140 and are intended to provide a seal secondary to the surface of the envelope 122 itself. Beads 142 do not take up very much of the available load and do not interfere with the concentrating of the sealing load between the fastener holes as taken up by the beads 140. Thus, beads 140, 142 provide a continuous bead along each side section, and which bead merges into the end sections.

As will be apparent, the rubber envelopes 122 provide undercuts 125 at the edges of 127 of each side section. The undercuts 125 extend inwardly from the edges 127 beyond the edges of core 120 and are of a depth greater than the anticipated amount of compression of the gasket assembly 110. As such, when the gasket assembly 110 is compressed, the rubber displaced will not "work" against the core at its edge and, therefore, the possibility of subsequent splitting of rubber in the vicinity of the core will be minimized.

The oil pan cover gasket assembly 110 is adapted to be installed in the same manner as is gasket assembly 10.

Thus, the gasket assembly of the present invention minimizes the splitting characteristic of elastomeric and other commercially used gaskets, as for oil pan gaskets. The rigid core permits robot installation and in any event facilitates easier installation of the gasket than is presently possible with multi-piece gaskets requiring bolting up. The rigid core provides excellent dimensional control of fastener location, more positive torque retention, and also provides a load distribution pattern which is more conducive to effective sealing, and which is preferable to the pattern secured from the typical all-rubber gasket. The stop members, when used, limit compression of the rubber and prevent the rubber from moving or being displaced enough to permit splitting, while assisting in providing gasket assembly of enhanced torque retention. It will be apparent that where the core is metal and the stops are of another rigid hard material, that the core and stops are separate. It will also be apparent that rigid plastic or other suitable materials may be used and, under appropriate circumstances, they may be integrally formed, and then suitably provided with an appropriately configured elastomeric envelope in which the stops function in the matter described.

From the foregoing, it will be apparent to those skilled in the art that further modifications may be made and provided without departing from the spirit of the invention. Accordingly, the scope of the invention is to be considered to be limited only to the extent made necessary by the claims.

What is claimed is:

1. A unitary, molded gasket assembly comprising a pair of side sections, each having a rigid assembly comprising a rigid core member and stop members, each stop member defining a fastener aperture through which a fastener is adapted to pass, said rigid core members extending along side portions of the gasket assembly, and elastomeric envelopes enveloping each of said core members and providing side sections of a first thickness,
integral elastomeric end portions joining said envelopes, said stop members being hard, rigid, and high-temperature resistant, and being secured in said gasket assembly, said stop members being of a second thickness less than said first thickness, whereby when said gasket assembly is disposed to be compressed between elements to be sealed, said stop members limit compression thereof and limit displacement of said elastomeric envelopes to prevent splitting of said elastomeric envelopes.

2. A unitary molded gasket assembly in accordance with claim 1 and wherein said core members and stop members are separately formed and assembled to each other.

3. A unitary molded gasket assembly in accordance with claim 1, and wherein each side section envelope is provided with undercuts at its edges, said undercuts extending inwardly from the edges to over said core to limit displacement of the elastomer at the core edges.

4. A unitary molded gasket assembly in accordance with claim 1, and wherein each said envelope is provided with elastomeric beads projecting outwardly from said envelope between said fastener apertures to concentrate sealing forces thereat when said gasket assembly is compressed.

5. A unitary molded gasket assembly in accordance with claim 4, and wherein each said envelope is provided with transitional beads bridging said elastomeric beads, said elastomeric beads and said transitional beads thereby providing a continuous sealing bead along each side section.

6. A unitary molded gasket assembly in accordance with claim 5 and wherein said continuous sealing beads merge with said end sections.

7. A unitary molded gasket assembly in accordance with claim 4 and wherein said gasket is an oil pan gasket and said end portions are arched.

8. A unitary molded gasket assembly in accordance with claim 7, and wherein said arched end portions define beaded surfaces to concentrate sealing forces applied thereto.

9. A unitary molded gasket assembly in accordance with claim 1, and wherein said second thickness is at least seventy five percent of said first thickness.

10. A unitary molded gasket assembly in accordance with claim 1, and wherein each said core member defines holes for receiving said stop members and said stop members are separate from said core member and are positioned in said holes, and wherein each stop member has an enlarged head and a smaller shank disposed in a said hole, and said shank is staked to said core.

11. A unitary molded gasket in accordance with claim 10, and wherein said rigid core members are formed of metal.

12. A unitary molded gasket assembly in accordance with claim 11,
and wherein each side section envelope is provided with undercuts at its edges, said undercuts extending inwardly from the edges to over said core to limit displacement of the elastomer at the core edges.

13. A unitary molded gasket assembly in accordance with claim 12, and wherein each said envelope is provided with elastomeric beads projecting outwardly from said envelope between said fastener apertures to concentrate sealing forces thereat when said gasket assembly is compressed, and wherein each said envelope is provided with transitional beads bridging said elastomeric beads, said elastomeric beads and transitional beads thereby providing a continuous sealing bead along each side section.

14. A unitary molded gasket assembly in accordance with claim 13, and wherein said gasket is an oil pan gasket, said end portions are arched, and said end portions define surfaces configured to concentrate sealing forces applied thereto.

15. A unitary molded gasket assembly in accordance with claim 13, and wherein said continuous sealing beads merge with said end portions.

16. A method of forming a unitary molded gasket assembly comprising the steps of providing a gasket having a pair of side sections, each having a rigid core member defining a plurality of core holes, said rigid core members extending along side portions of the gasket assembly, and elastomeric envelopes enveloping each of said core members and providing side sections of a first thickness, and said gasket also having integral elastomeric end portions joining said envelopes, each of said envelopes defining openings therethrough in line, respectively, with said core holes, positioning rigid, hard, temperature-resistant stop members in each core hole and securing same in said gasket assembly, each said stop member defining an aperture through which a fastener is adapted to pass, said stop members being of a second thickness less than said first thickness, whereby when said thusly formed gasket assembly is compressed between elements to be sealed, said stop members limit compression and limit displacement of said elastomeric envelopes to prevent splitting of said elastomeric envelopes.

17. The method in accordance with claim 16, and wherein each said envelope is formed with elastomeric beads projecting outwardly from said envelope between said fastener holes to concentrate sealing forces thereat when said gasket assembly is compressed.

18. The method in accordance with claim 17, and wherein each said envelope is formed with transitional beads bridging said elastomeric beads, said elastomeric beads and said transitional beads thereby providing a continuous sealing bead along each side section.

19. The method in accordance with claim 17 and wherein said gasket is an oil pan gasket and said end portions are formed as arched portions.

20. The method in accordance with claim 16, and wherein each core member is a metal core member, and comprising the step of providing said side sections with undercuts at its edges, said undercuts extending inwardly from the edges to over said metal core to limit displacement of the elastomer at the core edges.

21. The method in accordance with claim 20, and wherein each said stop member has an enlarged head and a smaller shank disposed in a said core hole, and comprising the further step of staking said shank to said core in said core hole.

* * * * *